United States Patent
Kondo et al.

(10) Patent No.: US 7,361,394 B2
(45) Date of Patent: Apr. 22, 2008

(54) OPTICAL DISK HAVING A HARD COAT LAYER HAVING SEBUM STAIN PROOFNESS IMPARTED

(75) Inventors: Satoshi Kondo, Yokohama (JP); Hirotsugu Yamamoto, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 292 days.

(21) Appl. No.: 11/131,280

(22) Filed: May 18, 2005

(65) Prior Publication Data

US 2005/0270962 A1 Dec. 8, 2005

Related U.S. Application Data

(63) Continuation of application No. PCT/JP03/14526, filed on Nov. 14, 2003.

(30) Foreign Application Priority Data

| | | |
|---|---|---|
| Nov. 18, 2002 | (JP) | ............................. 2002-333366 |
| Mar. 27, 2003 | (JP) | ............................. 2003-088301 |

(51) Int. Cl.
*B32B 3/02* (2006.01)
(52) U.S. Cl. ................ 428/64.1; 428/64.4; 430/270.11
(58) Field of Classification Search ................ 428/64.1, 428/64.4; 430/270.11
See application file for complete search history.

(56) References Cited

U.S. PATENT DOCUMENTS 5,449,702 A * 9/1995 Tayama et al. ................. 522/4
5,585,201 A 12/1996 Ha (Continued)

FOREIGN PATENT DOCUMENTS

CN 1053804 A 8/1991

(Continued)

OTHER PUBLICATIONS

U.S. Appl. No. 11/128,384, filed May 13, 2005, Kondo, et al.

(Continued)

*Primary Examiner*—Elizabeth Mulvaney
(74) *Attorney, Agent, or Firm*—Oblon, Spivak, McClelland, Maier & Neustadt, P.C.

(57) ABSTRACT

An optical disk of a system wherein a recording layer is to be irradiated throughout a thin film cover layer with a laser beam, wherein a hard coat layer (W) is formed on the thin film cover layer, and the hard coat layer (W) is made of a cured product of coating composition (X) comprising a polyfunctional compound (A) having at least two active energy ray curable polymerizable functional groups, a water and oil repellency-imparting agent (B), an active energy ray polymerization initiator (C) and a colloidal silica (D) having an average particle size of from 1 to 200 nm, provided that the water and oil repellency-imparting agent (B) is a water and oil repellency-imparting agent (B-T) having, in one molecule, a moiety (b-1) excellent in compatibility with the polyfunctional compound (A) and an active energy ray curable functional group (b-3). In the optical disk of the present invention, the hard coat layer formed of the surface of the thin film cover layer is excellent is abrasion resistance, transparency and long-term sebum stain proofness, particularly removability of fingerprints attached to its surface.

18 Claims, 1 Drawing Sheet

U.S. PATENT DOCUMENTS

| | | | |
|---|---|---|---|
| 6,833,393 B2 | 12/2004 | Ishizeki et al. | |
| 6,921,576 B2 * | 7/2005 | Terauchi et al. | 428/404 |
| 7,026,030 B2 * | 4/2006 | Itoh et al. | 428/64.1 |
| 7,074,472 B2 * | 7/2006 | Itoh et al. | 428/64.1 |
| 7,132,146 B2 * | 11/2006 | Itoh et al. | 428/64.1 |
| 7,132,460 B2 * | 11/2006 | Fujimoto et al. | 522/14 |
| 7,153,558 B2 * | 12/2006 | Hayashida et al. | 428/64.4 |
| 7,173,778 B2 * | 2/2007 | Jing et al. | 359/810 |

FOREIGN PATENT DOCUMENTS

| | | |
|---|---|---|
| CN | 1173943 A | 2/1998 |
| JP | 61-21113 | 1/1986 |
| JP | 1-315403 | 12/1989 |
| JP | 4-256435 | 9/1992 |
| JP | 5-117545 | 5/1993 |
| JP | 5-239122 | 9/1993 |
| JP | 9-183892 | 7/1997 |
| JP | 10-81839 | 3/1998 |
| JP | 11-203159 | 7/1999 |
| JP | 11-213444 | 8/1999 |
| JP | 11-217558 | 8/1999 |
| JP | 2001-344816 | 12/2001 |
| JP | 2002-92957 | 3/2002 |
| JP | 2002-245672 | 8/2002 |
| JP | 2003-196883 | 7/2003 |

OTHER PUBLICATIONS

U.S. Appl. No. 11/130,262, filed May 17, 2005, Kondo, et al.
U.S. Appl. No. 11/131,280, filed May 18, 2005, Kondo, et al.

* cited by examiner

OPTICAL DISK HAVING A HARD COAT LAYER HAVING SEBUM STAIN PROOFNESS IMPARTED

BACKGROUND OF THE INVENTION

1. Field of the Invention

The present invention relates to an optical disk of a system wherein a disk substrate, a recording layer and a thin film cover layer are laminated in this order, and the recording layer is to be irradiated through the thin film cover layer with a laser beam to be used for recording and retrieving data, wherein on the surface of the thin film cover layer, a hard coat layer is further formed which is excellent in abrasion resistance, transparency and long-term sebum stain proofness, particularly removability of fingerprint attached to its surface.

2. Discussion of Background

In recent years, attention has been drawn to an optical recording device capable of recording a large amount of data quickly in high density and capable of quickly retrieving the recorded information, in response to the progress in multimedia. Such an optical recording device includes one for retrieving information recorded on a read-only disk having data preliminarily stamped on a disk at the time of preparation of the disk to permit only to retrieve the information, such as a compact disk (CD) or a laser disk (LD), one for recording data and retrieving the data recorded on a recordable disk capable of recording only once, such as CD-R, and one for recording data and retrieving the data recorded on a rewritable disk capable of rewriting and erasing data as many times as desired by means of a magnetooptical recording system or a phase change recording system. By these optical recording devices, recording and retrieving of data are carried out by means of a beam spot having a laser beam narrowed down to a diffraction limit by a lens. The size of this beam spot will be about λ/NA where λ is the wavelength of the laser beam, and NA is the numerical aperture of the lens ("Basic and Application of Optical Disk Storage", compiled by Yoshihito Kakuta, Institute of Electronics, Information and Communication Engineers, 1995, p 65).

In order to record information in a higher density i.e. to form a smaller pit pattern on an optical recording medium, it is necessary to make a beam spot smaller. In order to reduce the size of the beam spot, two methods are conceivable from the above formula i.e. a method of shortening the laser beam wavelength (λ), or a method of increasing the numerical aperture (NA) of the lens. The wavelength of a semiconductor laser for an optical disk which is commonly used at present, is mainly from 780 to 680 nm, but a study is being made to employ an orange color laser having a shorter wavelength of 650 nm, or a green or blue laser beam having a further shorter wavelength.

Particularly, as a system of employing a blue laser, it has been proposed to obtain a higher recording density by adjusting the wavelength of the light source to a level of 400 nm and NA to at least 0.6. However, the allowance for an angle (a tilt angle) of the optical disk plane deviated from the right angle to the optical axis and the allowance for non-uniformity in thickness of the optical disk decrease due to shortening of the wavelength of the light source or increase of NA of the objective lens.

The reason for the decrease of such allowances is such that in the case of the tilt angle of the optical disk, coma aberration occurs, and in the case of the non-uniformity in thickness of the optical disk, spherical aberration occurs, whereby the condensing performance of the optical head device deteriorates, and read out of a signal tends to be difficult.

In a conventional compact disk (CD) or the like, the thickness of a cover layer which can be formed on the surface of a recording layer is 1.2 mm, and in a digital versatile disk (DVD) or the like, the thickness of such a cover layer is 0.6 mm, whereby the respective disk substrates themselves have played the role of such cover layers, and the recording layer has been irradiated with a laser beam through the disk substrates. However, in the system of employing a blue laser, not only the numerical aperture (NA) of the lens is made large, but also in order to increase the allowance for the above tilt or the allowance for the non-uniformity in thickness of the optical disk, it is necessary to make this cover layer thin to a level of 0.1 mm. Accordingly, in the blue laser system, it has become impossible to let the substrate itself play the role of the cover layer, like in the conventional optical disk. Therefore, it is necessary to form a recording layer made of a laminated film comprising a reflective film, a recording film and the like on the substrate and to form a thin film cover layer with a thickness of about 0.1 mm on the surface of the recording layer, and the recording layer will be irradiated with a laser beam through the thin film cover layer.

When a laser having a short wavelength like a blue laser is used, the distance between the optical head and the optical disk will be small at a level of from 0.1 to 0.2 mm. In an optical recording device, in order to accomplish a high data transfer rate, an optical disk is required to be rotated at an extremely high speed, and depending upon the combination of the wavelength of the laser beam to be used, the numerical aperture (NA) of the lens, the recording capacity of the disk and the desired data transfer rate, the maximum rotational speed of an optical disk may reach a level of at least 2,500 rpm, in some cases at least 5,000 rpm. As an optical disk is rotated at a high speed in the state where the distance of the optical head and the optical disk is very narrow, it is possible that the optical head will be in contact with the optical disk, and accordingly, the thin film cover layer covering the surface of the recording layer, is required to have a high abrasion resistance.

Further, when a laser having a shorter wavelength is used, scratches formed or dust deposited on a laser beam incident surface of the optical disk is likely to lead to errors at the time of recording or retrieving. Therefore, in order to prevent such errors at the time of recording or retrieving, the thin film cover layer constituting the laser beam incident surface is required to have higher abrasion resistance.

Further, not only scratches or dust deposited on the surface but also attachment of fingerprints or sebum resulting from handling by a user are likely to lead to errors at the time of recording or retrieving. In order to prevent such errors at the time of recording or retrieving, the thin film cover layer constituting the laser beam incidence surface is required to have not only abrasion resistance but also stain proofness against fingerprints and sebum.

Many attempts have been made to prevent attachment of stains such as fingerprints and sebum, and many of them are to employ a fluorine-containing compound. These attempts have been realized by achieving a surface which is likely to repel higher fatty acids and their esters, etc. as components of stains in common. Further, in order to maintain the effect of preventing attachment of stains such as fingerprints and sebum, such attempts have been made as introduction of a hydrolysable silyl group into a molecule of the fluorine-containing compound (JP-A-11-217558) and introduction of a crosslinking moiety with a resin forming the hard coat layer (JP-A-11-293159).

However, such a fluorine-containing compound has such a drawback that it is hardly compatible with a resin forming the hard coat layer, and when added as one composition, it is likely to impair transparency of a cured product. Further, in a case where the fluorine-containing compound is separately coated on the surface of the disk (JP-A-11-213444), since the fluorine-containing compound itself has no mechanical strength, it is required to coat it on the hard coat layer to prevent scratches on the disk surface, and thus the procedure will be complicated.

SUMMARY OF THE INVENTION

It is an object of the present invention to realize high performance of an optical disk of a system (hereinafter referred to simply as "optical disk") wherein a disk substrate, a recording layer and a thin film cover layer are laminated in this order, and the recording layer is to be irradiated through the thin film cover layer with a laser beam having a short wavelength such as a blue laser to be used for recording and/or retrieving data. Namely, it is an object of the present invention to provide an optical disk wherein a hard coat layer excellent in abrasion resistance, transparency and sebum stain proofness, particularly long-term fingerprint removability, is formed on the surface of the thin film cover layer of such an optical disk.

The present invention provides an optical disk of a system wherein a substrate, a recording layer and a thin film cover layer (V) with a thickness of from 5 to 200 μm, are laminated in this order, and the recording layer is to be irradiated through the thin film cover layer (V) with a laser beam to be used for recording and/or retrieving data, wherein a hard coating layer (W) is formed on the thin film cover layer (V), and the hard coat layer (W) is made of a cured product of a coating composition (X) comprising a polyfunctional compound (A) having at least two active energy ray curable polymerizable functional groups, a water and oil repellency-imparting agent (B), an active energy ray polymerization initiator (C) and a colloidal silica (D) having an average particle size of from 1 to 200 nm, provided that the water and oil repellency-imparting agent (B) is a water and oil repellency-imparting agent (B-T) having, in one molecule, a moiety (b-1) exerting water and oil repellency, a moiety (b-2) made of at least one portion selected from the group consisting of portions represented by the following formulae (1) to (4), and an active energy ray curable functional group (b-3):

 Formula (1)

 Formula (2)

 Formula (3)

 Formula (4)

wherein $R^1$ is a $C_{6-20}$ alkylene group, each of x and y is an integer of from 5 to 100, u is an integer of from 3 to 5, and t is an integer of from 1 to 20.

According to the present invention, an optical disk of a type wherein a recording layer and a thin film cover layer are laminated in this order on the surface of a substrate, and the recording layer is to be irradiated through the thin film cover layer with a laser beam having a short wavelength represented by a blue laser to be used for recording and/or retrieving data, wherein a hard coat layer excellent in abrasion resistance, transparency and long-term sebum stain proofness, particularly removability of fingerprints attached to its surface, is formed on the surface of the thin film cover layer, can be provided.

In the water and oil repellency-imparting agent (B-T), the moiety (b-1) exerting water and oil repellency is preferably made of at least one portion selected from the group consisting of portions represented by the following formulae (5) to (9):

 Formula (5)

 Formula (6)

 Formula (7)

 Formula (8)

 Formula (9)

wherein k is an integer of from 1 to 16, and each of p, q, r and s is an integer of from 1 to 100.

In the water and oil repellency-imparting agent (B-T), the moiety (b-1) exerting water and oil repellency is preferably made of at least one portion selected from the group consisting of portions represented by the following formulae (10) to (12):

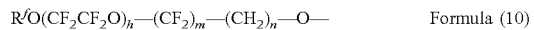 Formula (10)

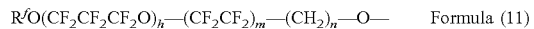 Formula (11)

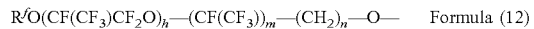 Formula (12)

wherein $R^f$ is a $C_{1-16}$ polyfluoroalkyl group (including one having an oxygen atom), h is an integer of from 1 to 50, each of m and n is an integer of from 0 to 3, and $6 \geq m+n > 0$.

The coating composition (X) preferably comprises 100 parts by mass of the polyfunctional compound (A) having at least two active energy ray curable polymerizable functional groups, from 0.01 to 10 parts by mass of the water and oil repellency-imparting agent (B), from 0.01 to 20 parts by mass of the active energy ray polymerization initiator (C) and from 5 to 300 parts by mass of the colloidal silica (D).

The colloidal silica (D) is preferably a modified colloidal silica obtained by surface modification with a mercapto group-containing silane compound (S1) wherein an organic group having a mercapto group, and a hydrolysable group or a hydroxyl group, are bonded to a silicon atom, or a modified colloidal silica obtained by surface modification with a (meth)acryloyl group-containing silane compound (S2) wherein an organic group having a (meth)acryloyl group, and a hydrolysable group or a hydroxyl group, are bonded to a silicon atom.

The mercapto group-containing silane compound (S1) is preferably a compound represented by the following formula (13):

 Formula (13)

wherein $R^2$ is a bivalent hydrocarbon group, $R^3$ is a hydroxyl group or a hydrolysable group, $R^4$ is a monovalent hydrocarbon group, and k is an integer of from 1 to 3.

The (meth)acryloyl group-containing silane compound (S2) is preferably a compound represented by the following formula (14):

 Formula (14)

wherein $R^5$ is a hydrogen atom or a methyl group, $R^2$ is a bivalent hydrocarbon group, $R^3$ is a hydroxyl group or a hydrolysable group, $R^4$ is a monovalent hydrocarbon group, and f is an integer of from 1 to 3.

Further, the present invention provides an optical disk of a system wherein a substrate, a recording layer and a thin film cover layer (V) with a thickness of from 5 to 200 μm, are laminated in this order, and the recording layer is to be irradiated through the thin film cover layer (V) with a laser beam to be used for recording and/or retrieving data, wherein a hard coat layer (W) is formed on the thin film cover layer (V), and the hard coat layer (W) has a contact angle on its surface relative to oleic acid of at least 65 degree initially and at least 60 degree after a moisture resistance test, a haze of at most 3%, and a change in the haze by Taber abrasion test (abrasive wheels: CS-10F, load on one wheel: 500 g, 500 cycles) as defined by ISO9352 of at most 10%.

The hard coat layer (W) is preferably made of a cured product layer formed by curing a coating composition (X) comprising a polyfunctional compound (A) having at least two active energy ray curable polymerizable functional groups, a water and oil repellency-imparting agent (B), an active energy ray polymerization initiator (C) and a colloidal silica (D) having an average particle size of from 1 to 200 nm.

Figure 1:
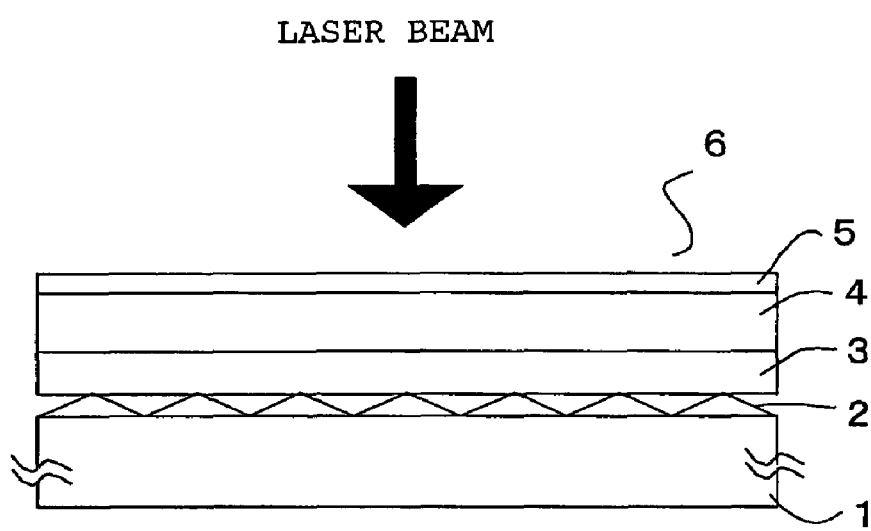
FIG. 1 is a cross-sectional schematic view of an optical disk as an embodiment of the present invention.

Meaning of Symbols
1: substrate, 2: guide groove, 3: recording layer,
4: thin film cover layer (V),
5: hard coat layer (X),
6: optical disk

DETAILED DESCRIPTION OF THE PREFERRED EMBODIMENTS

The optical disk in the present invention is an ultrahigh density recording optical disk which employs a short wavelength laser beam, preferably an orange laser beam with a wavelength of 650 nm, more preferably a green laser beam or a blue laser beam with a shorter wavelength, for recording and/or retrieving data. Namely, it is an optical disk of a type wherein a recording layer is formed on an optical disk substrate, a thin film cover layer (V) is independently formed on the surface of the recording layer, and a laser beam is to be applied through the thin film cover layer (V).

In the optical disk of the present invention, on the surface of the thin film cover layer (V) of the optical disk of the above construction, a hard coat layer (W) made of a cured product of the coating composition (X) is further formed.

The coating composition (X) comprises a polyfunctional compound (A) having at least two active energy ray curable polymerizable functional groups (hereinafter referred to simply as "polyfunctional compound (A)". The polyfunctional compound (A) is a monomer which undergoes polymerization when irradiated with active energy rays in the presence of an active energy ray polymerization initiator (C). Specifically, it represents a polyfunctional polymerizable monomer having at least two acryloyl groups or methacryloyl groups as polymerizable functional groups in one molecule. However, it does not include a compound corresponding to the water and oil repellency-imparting agent (B) as mentioned hereinafter. In the following explanation, an acryloyl group and a methacryloyl group will generically be referred to as a (meth)acryloyl group.

The polyfunctional compound (A) in the present invention corresponds to the polyfunctional compound (a) disclosed in paragraphs 0013 to 0052 of JP-A-10-81839.

In the present invention, the polyfunctional compound (A) is preferably one having at least three polymerizable functional groups in its molecule, wherein the molecular weight per functional group is at most 120, with a view to developing high degree abrasion resistance. The following compounds may be mentioned as the polymerizable compound (A) which satisfies such conditions.

A polyfunctional compound which is a polyester as a reaction product of pentaerythritol or polypentaerythritol and (meth)acrylic acid, and which has at least 3, more preferably from 4 to 20 (meth)acryloyl groups. Specifically, trimethylolpropane tri(meth)acrylate, pentaerythritol tri(meth)acrylate, pentaerythritol tetra(meth)acrylate, dipentaerythritol hexa(meth)acrylate and the like are preferably mentioned.

On the other hand, a (meth)acryloyl group-containing compound having a urethane bond in its molecule (hereinafter referred to as an acrylic urethane) may be preferably used since the urethane bond functions as a pseudo crosslinking site by the action of the hydrogen bond, and sufficiently high degree abrasion resistance can be developed even when the molecular weight per functional group is not so small as above. The following compounds are preferred as the polyfunctional compound (A) which satisfies such conditions.

A polyfunctional compound which is an acrylic urethane as a reaction product of pentaerythritol or polypentaerythritol, polyisocyanate and hydroxyalkyl(meth)acrylate, and which has at least 3, more preferably from 4 to 20 (meth)acryloyl groups.

A polyfunctional compound which is an acrylic urethane as a reaction product of a hydroxyl group-containing poly(meth)acrylate of pentaerythritol or polypentaerythritol, and polyisocyanate, and which has at least 3, more preferably from 4 to 20 (meth)acryloyl groups.

The coating composition (X) of the present invention may contain a polymerizable monomer other than the polyfunctional compound (A). The polymerizable monomer other than the polyfunctional compound (A) may be a monofunctional polymerizable monomer such as alkyl(meth)acrylate or allyl(meth)acrylate.

In a case where the polymerizable monomer other than the polyfunctional compound (A) is contained, the polyfunctional compound (A) is contained in an amount of preferably from 20 to 100 mass %, more preferably from 50 to 100 mass %, particularly preferably from 70 to 100 mass %, in the total mass of the polyfunctional compound (A) and the polymerizable monomer other than the polyfunctional compound (A). Within this range, the hard coat layer (W) made of a cured product layer obtained by curing the coating composition (X) will be excellent in abrasion resistance.

The coating composition (X) of the present invention contains a water and oil repellency-imparting agent (B).

The coating composition (X) of the present invention contains the water and oil repellency-imparting agent (B) in an amount of preferably from 0.01 to 10 parts by mass, more preferably from 0.1 to 5.0 parts by mass, per 100 parts by mass of the polyfunctional compound (A). When the amount of the water and oil repellency-imparting agent is within this range, the hard coat layer (W) made of a cured product layer obtained by curing the coating composition (X) will be excellent in water and oil repellency and abrasion resistance.

If the amount of the water and oil repellency-imparting agent (B) is less than 0.01 part by mass, the hard coat layer (W) tends to be poor in water and oil repellency. On the other hand, if the amount of the water and oil repellency-imparting agent (B) exceeds 10 parts by mass, the hard coat layer (W) tends to be plasticized, have decreased abrasion resistance and be poor in transparency.

The water and oil repellency-imparting agent (B) is a water and oil repellency-imparting agent (B-T) having, in one molecule, a moiety (b-1) exerting water and oil repellency, a moiety (b-2) made of at least one portion selected from the group consisting of portions represented by the following formulae (1) to (4), and an active energy ray curable functional group (b-3):

—R$^1$—  Formula (1)

—(CH$_2$CH$_2$O)$_x$—  Formula (2)

—(CH$_2$CH(CH$_3$)O)$_y$—  Formula (3)

—(C(=O)C$_u$H$_{2u}$O)$_t$—  Formula (4)

wherein R$^1$ is an alkylene group having a carbon number of from 6 to 20, each of x and y is an integer of from 5 to 100, u is an integer of from 3 to 5, and t is an integer of from 1 to 20.

In the water and oil repellency-imparting agent (B-T), the moiety (b-1) exerting water and oil repellency (hereinafter sometimes referred to as moiety (b-1)) means a moiety comprising a fluorine-containing organic group of a fluorine-containing compound which is generally used as a water repellent or an oil repellent (such as a homopolymer of a polymerizable monomer containing a polyfluoroalkyl group such as a (meth)acrylate containing a perfluoroalkyl group, or a copolymer of such a monomer with another polymerizable monomer such as an acrylate, maleic anhydride, chloroprene, butadiene or methyl vinyl ketone, a fluorinated polyether compound or a fluorosilicone compound).

In the water and oil repellency-imparting agent (B-T), the moiety (b-1) exerting water and oil repellency is preferably made of at least one portion selected from the group consisting of portions represented by the following formulae (5) to (9):

C$_k$F$_{2k+1}$—  Formula (5)

—(CF$_2$CF$_2$O)$_p$—  Formula (6)

—(CF$_2$CF(CF$_3$)O)$_q$—  Formula (7)

—(CF$_2$CF$_2$CF$_2$O)$_r$—  Formula (8)

—(CF$_2$O)$_s$—  Formula (9)

wherein k is an integer of from 1 to 16, and each of p, q, r and s is an integer of from 1 to 100.

The portion of the above formula (5) is a perfluoroalkyl group, and k representing the carbon number is preferably from 1 to 16. When the carbon number is within this range, the crystallinity of the group tends to be weak, and transparency of the coating film after curing will not be impaired.

The portion of the above formula (6) represents a unit of tetrafluoroethylene oxide, each of the portions of the formulae (7) and (8) represents a unit of hexafluoropropylene oxide, and the portion of the formula (9) represents a unit of difluoromethylene. Each of p, q, r and s representing the degree of polymerization is preferably at most 100. When each of p, q, r and s is within the above range, the surface of the hard coat layer (W) will be excellent in water and oil repellency, and excellent fingerprint removability will be maintained over a long period. Each of p, q, r and s is more preferably an integer of from 1 to 80.

In the water and oil repellency-imparting agent (B-T), the moiety (b-1) exerting water and oil repellency may have any one of the portions represented by the above formulae (5) to (9) or may have at least two types in the same molecule.

In the water and oil repellency-imparting agent (B-T), the moiety (b-1) exerting water and oil repellency is preferably made of at least one portion selected from the group consisting of portions represented by the following formulae (10) to (12):

R$^f$O(CF$_2$CF$_2$O)$_h$—(CF$_2$)$_m$—(CH$_2$)$_n$—O—  Formula (10)

R$^f$O(CF$_2$CF$_2$CF$_2$O)$_h$—(CF$_2$CF$_2$)$_m$—(CH$_2$)$_n$—O—  Formula (11)

R$^f$O(CF(CF$_3$)CF$_2$O)$_h$—(CF(CF$_3$))$_m$—(CH$_2$)$_n$—O—  Formula (12)

wherein R$^f$ is a C$_{1-16}$ polyfluoroalkyl group (including one having an oxygen atom), h is an integer of from 1 to 50, each of m and n is an integer of from 0 to 3, and 6≧m+n>0.

In the present invention, the polyfluoroalkyl group is a group having two or more hydrogen atoms in an alkyl group substituted by fluorine atoms. The R$^f$ group preferably has a straight chain structure, but may have a branched structure, and when it has a branched structure, it is preferred that the branched portion is present at the terminal of the R$^f$ group, and the terminal is a short chain with a carbon number of from 1 to 4.

The carbon number of the R$^f$ group is preferably from 1 to 8. When the carbon number of the R$^f$ group is within this range, the crystallinity of the R$^f$ group tends to be relatively weak, and the hard coat layer made of a cured product layer will be excellent in transparency.

The R$^f$ group may contain another halogen atom other than fluorine atoms. Said another halogen atom is preferably a chlorine atom. Further, between the carbon-carbon linkage in the R$^f$ group, an etheric oxygen atom, an ester linkage, a sulfonamide group or a thioetheric sulfur atom may be present.

The number of fluorine atoms in the R$^f$ group, as represented by {(number of fluorine atoms in R$^f$ group)/(number of hydrogen atoms contained in a corresponding alkyl group having the same carbon number as the R$^f$ group)}×100 (%), is preferably at least 60%, particularly preferably at least 80%.

Further, the R$^f$ group is preferably a group having all hydrogen atoms in an alkyl group substituted by fluorine atoms (i.e. a perfluoroalkyl group) or a group having a perfluoroalkyl group at its terminal.

The following groups may be mentioned as specific examples of the R$^f$ group:

CF$_3$—, C$_2$F$_5$—, C$_3$F$_7$— (including structural isomeric groups such as CF$_3$(CF$_2$)$_2$— and (CF$_3$)$_2$CF—), C$_4$F$_9$— (including structural isomeric groups such as CF$_3$(CF$_2$)$_3$—, (CF$_3$)$_2$CFCF$_2$—, (CF$_3$)$_3$C— and CF$_3$CF$_2$(CF$_3$)CF—), C$_5$F$_{11}$— (such as CF$_3$(CF$_2$)$_4$—), C$_6$F$_{13}$— (such as CF$_3$(CF$_2$)$_5$—), C$_7$F$_{15}$— (such as CF$_3$(CF$_2$)$_6$—), C$_8$F$_{17}$— (such as CF$_3$(CF$_2$)$_7$—), C$_9$F$_{19}$— (such as CF$_3$(CF$_2$)$_8$—), C$_{10}$F$_{21}$— (such as CF$_3$(CF$_2$)$_9$—), C$_{12}$F$_{25}$— (such as CF$_3$(CF$_2$)$_{11}$—), C$_{14}$F$_{29}$— (such as CF$_3$(CF$_2$)$_{13}$—, C$_{16}$F$_{33}$— (such as CF$_3$(CF$_2$)$_{15}$—) Cl(CF$_2$)$_v$—, H(CF$_2$)$_v$— (v is an integer of from 1 to 16), (CF$_3$)$_2$CF(CF$_2$)$_w$— (w is an integer of from 1 to 13) and the like.

The following groups may be mentioned as specific examples of the $R^f$ group which is a group having an etheric oxygen atom, an ester linkage, a sulfonamide group or a thioetheric sulfur atom between the carbon-carbon linkage:

$CF_3(CF_2)_4OCF(CF_3)$—,
$F[CF(CF_3)CF_2O]_hCF(CF_3)CF_2CF_2$—,
$F[CF(CF_3)CF_2O]_iCF(CF_3)$—,
$F[CF(CF_3)CF_2O]_iCF_2CF_2$—,
$F(CF_2CF_2CF_2O)_iCF_2CF_2$—,
$F(CF_2CF_2O)_iCF_2CF_2$—,
$F(CF_2)_5SCF(CF_3)$—,
$F[CF(CF_3)CF_2S]_hCF(CF_3)CF_2CF_2$—,
$F[CF(CF_3)CF_2S]_iCF(CF_3)$—,
$F[CF(CF_3)CF_2S]_iCF_2CF_2$—,
$F(CF_2CF_2CF_2S)_iCF_2CF_2$—,
$F(CF_2CF_2S)_jCF_2CF_2$— wherein h is an integer of from 1 to 3, i is an integer of from 1 to 4, and j is an integer of from 1 to 7.

In the present invention, among the above exemplified $R^f$ groups, $CF_3$—, $C_2F_5$— or $C_3F_7$— is preferred. When the $R^f$ group is such a group, a material is easily available to prepare the portion represented by each of the formulae (10) to (12), and preparation of this portion is also easy.

In the coating composition (X), as the water and oil repellency-imparting agent (B-T), a plural types of water and oil repellency-imparting agents (B-T) having different moieties (b-1) exerting water and oil repellency may be used in combination.

In the water and oil repellency-imparting agent (B-T), the moiety (b-2) made of at least one portion selected from the group consisting of portions represented by the formulae (1) to (4) (hereinafter sometimes referred to as moiety (b-2)) has a function to exert compatibility with the polyfunctional compound (A):

 —$R^1$—    Formula (1)

 —$(CH_2CH_2O)_x$—    Formula (2)

 —$(CH_2CH(CH_3)O)_y$—    Formula (3)

 —$(C(=O)C_uH_{2u}O)_t$—    Formula (4)

wherein $R^1$ is a $C_{6-20}$ alkylene group, each of x and y is an integer of from 5 to 100, u is an integer of from 3 to 5, and t is an integer of from 1 to 20.

The moiety (b-1) exerting water and oil repellency in the water and oil repellency-imparting agent (B-T) has a low affinity with a resin matrix formed from the polyfunctional compound (A), and thus when the coating composition (X) is cured, the water and oil repellency-imparting agent (B-T) is likely to bleed out on the surface of the resin matrix, thus impairing transparency of the hard coat layer (W) made of a cured product layer.

The water and oil repellency-imparting agent (B-T) having a moiety (b-2) excellent in compatibility with the polyfunctional compound (A) has moderate compatibility with the polyfunctional compound (A) even when a moiety (b-1) having a low affinity with the polyfunctional compound (A) is selected.

In the present invention, the water and oil repellency-imparting agent (B-T) has moderate compatibility with the polyfunctional compound (A), and thus when the coating composition (X) is coated on the substrate surface, the water and oil repellency-imparting agent (B-T) segregates on the surface of the coating film without impairing transparency of the coating film before curing. Thus, transparency of the hard coat layer (W) will not be impaired.

The portion of the above formula (1) is a straight chain or branched alkylene group having a carbon number of from 6 to 20. When the carbon number is within this range, the compatibility of the water and oil repellency-imparting agent (B-T) with the polyfunctional compound (A) tends to be moderate, and further, the crystallinity of the group tends to be relatively weak, and thus transparency of the hard coat layer (W) made of a cured product layer and the water and oil repellency of the surface of the layer tend to be excellent, and excellent fingerprint removability will be maintained over a long period. If the carbon number is at most 5, the compatibility with the polyfunctional compound (A) tends to be low, thus impairing transparency of the coating film before curing. This means that the transparency of the hard coat layer (W) after curing will be impaired. On the other hand, if the carbon number exceeds 20, the crystallinity of the group tends to be strong, and the transparency of the hard coat layer after curing will be impaired also.

The portion of the above formula (2) represents a unit of ethylene oxide. x representing the degree of polymerization is from 5 to 100, preferably from 5 to 80. When x is within this range, the water and oil repellency-imparting agent (B-T) has moderate compatibility with the polyfunctional compound (A), and further, the crystallinity of the unit tends to be relatively weak, and thus transparency of the hard coat layer (W) made of a cured product layer and the water and oil repellency of the surface of the layer tend to be excellent, and excellent fingerprint removability will be maintained over a long period. When x is at most 4, the compatibility of the water and oil repellency-imparting agent (B-T) tends to be low, thus impairing the transparency of the hard coat layer (W). On the other hand, if x exceeds 100, the compatibility of the water and oil repellency-imparting agent (B-T) tends to be too high, and the water and oil repellency-imparting agent (B-T) will hardly segregate on the surface of the coating film, and thus the hard coat layer (W) will not have sufficient water and oil repellency.

The portion of the above formula (3) represents a unit of propylene oxide. y representing the degree of polymerization is from 5 to 100, preferably from 5 to 80. When y is within this range, the water and oil repellency-imparting agent (B-T) has moderate compatibility with the polyfunctional compound (A), and thus the transparency of the hard coat layer (W) made of a cured product layer and the water and oil repellency on the surface of the layer tend to be excellent, and excellent fingerprint removability will be maintained over a long period. When y is at most 4, the compatibility of the water and oil repellency-imparting agent (B-T) tends to be low, thus impairing transparency of the hard coat layer (W). On the other hand, if y exceeds 100, the compatibility of the water and oil repellency-imparting agent (B-T) tends to be too high, and the water and oil repellency-imparting agent (B-T) will hardly segregate on the coating film surface, and thus the hard coat layer (W) will not have sufficient water and oil repellency.

The portion of the above formula (4) represents a unit obtained from a ring-opened product from lactone. The carbon number of the group is preferably from 3 to 5 in view of availability. Further, t representing the degree of polymerization is preferably at most 20. When t is within this range, the crystallinity of the unit will be suppressed, and the hard coat layer (W) made of a cured product layer tends to be excellent in transparency.

The water and oil repellency-imparting agent (B-T) may have, as the moiety (b-2), any one of the portions represented by the above formulae (1) to (4), or may have two or more types of the portions in the same molecule.

Further, in the coating composition, as the water and oil repellency-imparting agent (B-T), a plural types of water and oil repellency-imparting agents (B-T) having different moieties (b-2) may be used in combination.

In the water and oil repellency-imparting agent (B-T), the active energy ray curable functional group (b-3) (hereinafter sometimes referred to as functional group (b-3)) may be a functional group having radical reactivity, and specifically, a (meth)acryloyl group, an allyl group, a vinyl group, a vinyl ether group, a halogen group or a mercapto group may, for example, be preferably mentioned. It is particularly preferably a (meth)acryloyl group in view of the radical reactivity and the stability of the chemical bond to be formed.

When the coating composition (X) is cured by irradiation with active energy rays, the functional group (b-3) also undergoes a curing reaction and is covalently bonded to the polyfunctional compound (A) constituting the resin component of the coating composition (X). Thus, the water and oil repellency-imparting agent (B-T) which has the functional group (b-3), is bonded to the resin component of the hard coat layer (W) made of a cured product layer of the coating composition (X) by means of a covalent bond. Thus, the water and oil repellency-imparting agent (B-T) is present as fixed on the surface of the hard coat layer (W). Therefore, the water and oil repellency-imparting agent (B-T) will not volatilize from the surface of the hard coat layer (X), and the surface of the hard coat layer (W) maintains excellent water and oil repellency over a long period, and excellent fingerprint removability will be maintained over a long period.

The water and oil repellency-imparting agent (B-T) may have, as the functional group (b-3), any one of the above exemplified functional groups, or may have two or more types of functional groups in the same molecule. Further, in the coating composition (X), as the water and oil repellency-imparting agent (B-T), a plural types of water and oil repellency-imparting agents (B-T) having different functional groups (b-3) may be used in combination.

In the water and oil repellency-imparting agent (B-T), the boding form of the respective moieties is not particularly limited. As the bonding form of the respective moieties in the water and oil repellency-imparting agent (B-T), specifically, the following examples may be preferably mentioned.

1. Straight chain type: a type wherein the moiety (b-1), the moiety (b-2) and the functional group (b-3) are linearly connected. Hereinafter referred to as straight chain type.

With respect to the straight chain type, the raw material compound forming the moiety (b-1) is preferably a compound having the moiety (b-1) and having its terminal modified with a hydroxyl group. For example, one having the terminal of the portion of the above formula (10), (11) or (12) modified with a hydroxyl group, or polyhexafluoropropylene oxide having its terminal modified with a hydroxyl group, may be preferably mentioned.

By polymerizing a monomer such as ethylene oxide, propylene oxide or lactone as (b-2) to the terminal hydroxyl group of the compound having the moiety (b-1) and having its terminal modified with a hydroxyl group, the moiety (b-2) can be constituted adjacently to the moiety (b-1). Otherwise, a polymer such as polyethylene glycol or polypropylene glycol as the moiety (b-2) may be connected to the moiety (b-1) by means of a urethane bond using e.g. a bifunctional isocyanate. Here, depending upon the chemical structure of the raw material compound forming the moiety (b-1), the acidity of the terminal hydroxyl group tends to be too high, and polymerization of the monomer such as ethylene oxide, propylene oxide or lactone may not smoothly proceed in some cases. In such a case, ethylene carbonate may be added while decarboxylating it in the presence of a catalyst to insert one unit of ethylene oxide so as to decrease the acidity of the terminal hydroxyl group, and then the monomer such as ethylene oxide, propylene oxide or lactone is polymerized to constitute the moiety (b-2).

By the operation so far, the terminal of the moiety (b-2) is a hydroxyl group. Thus, as a method of introducing the functional group (b-3) (such as a (meth)acryloyl group), a method of introducing it by means of an ester linkage using e.g. (meth)acrylic acid or (meth)acrylic acid chloride, a method of introducing it by means of a urethane bond using 2-(meth)acrylic acid ethyl isocyanate, or a method of introducing e.g. 2-hydroxyethyl(meth)acrylate, 3-hydroxypropyl (meth)acrylate or 4-hydroxybutyl(meth)acrylate by a urethane bond by means of a bifunctional isocyanate may, for example, be preferably mentioned.

Further, a method may also be preferably mentioned wherein one having one terminal of a polymer such as polyethylene glycol or polypropylene glycol already modified with a (meth)acryloyl group, is used and bonded to the hydroxyl group at the terminal of the moiety (b-1) by means of a urethane bond using e.g. a bifunctional isocyanate to connect the moiety (b-2) and the functional group (b-3) in this order adjacently to the moiety (b-1) all at once.

2. Copolymerization type: a radical polymerizable macromer having the moiety (b-1) and a radical polymerizable macromer having the moiety (b-2) may be prepared, and such macromers are copolymerized, and then the functional group (b-3) is introduced. Hereinafter referred to as copolymerization type.

As the macromer having the moiety (b-1), one having the terminal of the portion of the above formula (10), (11) or (12) modified with a (meth)acryloyl group, or a fluorinated alkyl ester of (meth)acrylic acid may, for example, be preferably mentioned.

As the macromer having the moiety (b-2), one having one terminal of a polymer such as polyethylene glycol or polypropylene glycol modified with a (meth)acryloyl group, or one having one terminal of an alkyl ester of (meth)acrylic acid or a ring-opened polymer of lactone modified with a (meth)acryloyl group, may, for example, be preferably mentioned.

The functional group (b-3) may be introduced to the terminal of the copolymer of the above two macromers. For example, a method of introducing it to a hydroxyl group at one terminal at which no (meth)acryloyl group is added of the above two macromers, by means of an ester linkage using e.g. (meth)acrylic acid or (meth)acrylic acid chloride, or a method of introducing it by means of a urethane bond using 2-methacrylic acid ethyl isocyanate, may, for example, be preferably mentioned.

Otherwise, a method wherein the above two macromers and 2-hydroxyethyl(meth)acrylate, 3-hydroxypropyl(meth) acrylate, 4-hydroxybutyl(meth)acrylate or the like are copolymerized, and then the functional group (b-3) is introduced by means of an ester linkage using e.g. (meth)acrylic acid or (meth)acrylic acid chloride, or a method of introducing it by means of a urethane bond using 2-methacrylic acid ethyl isocyanate, may also be mentioned.

In either of the above straight chain type and copolymerization type, the functional group (b-3) is bonded preferably adjacently to the moiety (b-2). When the functional group (b-3) is bonded adjacently to the moiety (b-2), the surface migration characteristics of the moiety (b-1) tend to be high, and the surface of the hard coat layer (W) tends to be excellent in water and oil repellency, as compared with a case where the functional group (b-3) is bonded adjacently to the moiety (b-1).

The coating composition (X) may contain a known water and oil repellency-imparting agent other than the above water and oil repellency-imparting agent (B-T). Such a known water and oil repellency-imparting agent may, for example, be a fluorine type water and oil repellency-imparting agent using e.g. a fluororesin of e.g. tetrafluoroethylene or vinylidene fluoride, or a fluorine compound having a perfluoroalkyl group, a silicone type water and oil repellency-imparting agent using an organopolysiloxane having a siloxane bond in its main chain and having an alkyl group such as a methyl group, an ethyl group or a propyl group or a fluoroalkyl group in its side chain, a wax type water and oil repellency-imparting agent using e.g. bees wax or paraffin, or a metal salt type water and oil repellency-imparting agent using a salt of zirconium and a fatty acid, or a salt of aluminum and a fatty acid. However, the known water and oil repellency-imparting agent in the present specification does not include compounds corresponding to the above water and oil repellency-imparting agent (B-T). When such a known water and oil repellency-imparting agent is contained, it is contained preferably in an amount of at most 30 parts by mass per 100 parts by mass of the total mass of the water and oil repellency-imparting agent (B-T) and the known water and oil repellency-imparting agent.

The coating composition (X) contains an active energy ray polymerization initiator (C). The coating composition (X) contains the active energy ray polymerization initiator (C) preferably in an amount of from 0.1 to 20 parts by mass per 100 parts by mass of the polymerizable monomer (A). When the amount of the active energy ray polymerization initiator (C) is within this range, curing properties will be sufficient, and all the active energy ray polymerization initiator (C) will decompose at the time of curing.

The active energy ray polymerization initiator (C) widely includes known photopolymerization initiators. Specifically, the known photopolymerization initiator may, for example, be an aryl ketone photopolymerization initiator (such as an acetophenone, a benzophenone, an alkylaminobenzophenone, a benzyl, a benzoin, a benzoin ether, a benzyl dimethyl ketal, a benzoyl benzoate or an α-acyloxime ester), a sulfur-containing photopolymerization initiator (such as a sulfide or a thioxanthone), an acylphosphine oxide (such as an acyldiarylphosphine oxide) or other photopolymerization initiators. The photopolymerization initiator may be used as a mixture of at least two types thereof in combination. Further, the photopolymerization initiator may be used in combination with a photosensitizer such as an amine. The following compounds may be mentioned as specific photopolymerization initiators, however, the photopolymerization initiator is not limited thereto.

4-Phenoxydichloroacetophenone, 4-t-butyl-dichloroacetophenone, 4-t-butyl-trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4-(2-hydroxyethoxy)phenyl}-2-hydroxy-2-methyl-propan-1-one, 1-hydroxycyclohexylphenylketone and 2-methyl-1-{4-(methylthio)phenyl}-2-morpholinopropan-1-one.

Benzyl, benzoin, benzoin methyl ether, benzoin ethyl ether, benzoin isopropyl ether, benzoin isobutyl ether, benzyl dimethyl ketal, benzophenone, benzoyl benzoate, methyl benzoyl benzoate, 4-phenylbenzophenone, hydroxybenzophenone, benzophenone acrylate, 3,3'-dimethyl-4-methoxybenzophenone, 3,3',4,4'-tetrakis(t-butylperoxycarbonyl)benzophenone, 9,10-phenanthrenequinone, camphorquinone, dibenzosuberone, 2-ethylanthraquinone, 4',4''-diethylisophthalophenone, (1-phenyl-1,2-propanedione-2-(o-ethoxycarbonyl)oxime), α-acyloxime ester and methyl phenyl glyoxylate.

4-Benzoyl-4'-methyldiphenyl sulfide, thioxanthone, 2-chlorothioxanthone, 2-methylthioxanthone, 2,4-dimethylthioxanthone, isopropylthioxantone, 2,4-dichlorothioxanthone, 2,4-diethylthioxanthone, 2,4-diisopropylthioxantone, 2,4,6-trimethylbenzoyl diphenylphosphine oxide, benzoyl diphenylphosphine oxide, 2,6-dimethylbenzoyl diphenylphosphine oxide and bis(2,6-dimethoxybenzoyl)-2,4,4-trimethylpentylphosphine oxide.

The coating composition (X) contains a colloidal silica (D) having an average particle size of from 1 to 200 nm. The colloidal silica (D) is ultrafine particles of silicic anhydride dispersed in a dispersion medium in the form of colloid. The dispersion medium is not particularly limited, and preferably water, a lower alcohol, a cellosolve or the like. Specifically, the dispersion medium may, for example, be water, methanol, ethanol, isopropyl alcohol, n-butanol, ethylene glycol, methyl cellosolve, ethyl cellosolve, butyl cellosolve, propylene glycol monomethyl ether acetate, dimethylacetamide, toluene, xylene, methyl acetate, ethyl acetate, pentyl acetate or acetone.

The average particle size of the colloidal silica (D) is from 1 to 200 nm, and it is particularly preferably from 1 to 50 nm, so as to obtain high transparency of the hard coat layer (W).

Further, in order to improve dispersion stability of the colloidal silica (D), the surface of the particles may be modified with a hydrolysate of a hydrolysable silane compound. Here, "the surface is modified with a hydrolysate" means such a state that a hydrolysate of a hydrolysable silane compound is physically or chemically bonded to a part of or the entire silanol groups on the surface of the colloidal silica particles, whereby the surface characteristics are improved. Silica particles, to the surface of which a hydrolysate of a hydrolysable silane compound which further undergoes a condensation reaction is similarly bonded, are also included. This surface modification can easily be carried out by subjecting a part of or the entire hydrolysable groups of the hydrolysable silane compound to hydrolysis or to hydrolysis and a condensation reaction in the presence of the silica particles.

The hydrolysable silane compound is preferably a silane compound wherein an organic group having a functional group such as a (meth)acryloyl group, an amino group, an epoxy group or a mercapto group, and a hydrolysable group such as an alkoxy group or a hydroxyl group, are bonded to a silicon atom. The hydrolysable group in the present specification means a group which may be hydrolyzed at the bonding portion with the silicon atom. Preferably, it may, for example, be 3-(meth)acryloyloxypropyltrimethoxysilane, 2-(meth)acryloyloxyethyltrimethoxysilane, 3-(meth)acryloyloxypropyltriethoxysilane, 2-(meth)acryloyloxyethyltriethoxysilane, 3-aminopropyltriethoxysilane, 3-aminopropyltrimethoxysilane, N-(2-aminoethyl)-3-aminopropylmethyldimethoxysilane, 3-glycidoxypropyltrimethoxysilane or 3-mercaptopropyltrimethoxysilane.

The hydrolysable silane compound is preferably a mercapto group-containing silane compound (S1) wherein an organic group having a mercapto group, and a hydrolysable group or a hydroxyl group, are bonded to a silicon atom, in view of high reactivity with the polymerizable monomer (A). The mercapto group-containing silane compound (S1) is preferably a compound represented by the following formula (13):

$$HS-R^2-SiR^3{}_k R^4{}_{3-k} \qquad \text{Formula (13)}$$

wherein $R^2$ is a bivalent hydrocarbon group, $R^3$ is a hydroxyl group or a hydrolysable group, $R^4$ is a monovalent hydrocarbon group, and k is an integer of from 1 to 3.

In the formula (13), $R^2$ is preferably a $C_{2-6}$ alkylene group, particularly preferably a $C_3$ alkylene group. $R^4$ is preferably an alkyl group having a carbon number of at most 4, particularly preferably a methyl group or an ethyl group. $R^3$ is preferably a hydrolysable group, particularly preferably a halogen group or an alkoxy group having a carbon number of at most 4. The alkoxy group is more preferably a methoxy group or an ethoxy group in view of favorable hydrolysability. k is preferably 2 or 3.

Typical examples of the mercapto group-containing silane compound represented by the formula (13) are shown below. Here, OMe represents a methoxy group, OEt represents an ethoxy group, and OPr represents a n-propoxy group.

HS—CH$_2$CH$_2$CH$_2$—Si(OMe)$_3$, HS—CH$_2$CH$_2$CH$_2$—Si(OEt)$_3$, HS—CH$_2$CH$_2$CH$_2$—Si(OPr)$_3$, HS—CH$_2$CH$_2$CH$_2$—SiMe(OMe)$_2$, HS—CH$_2$CH$_2$CH$_2$—SiMe(OEt)$_2$, HS—CH$_2$CH$_2$CH$_2$—SiMe(OPr)$_2$, HS—CH$_2$CH$_2$CH$_2$—SiMe$_2$(OMe), HS—CH$_2$CH$_2$CH$_2$—SiMe$_2$(OEt), HS—CH$_2$CH$_2$CH$_2$—SiMe$_2$(OPr), HS—CH$_2$CH$_2$CH$_2$—SiCl$_3$, HS—CH$_2$CH$_2$CH$_2$—SiBr$_3$, HS—CH$_2$CH$_2$CH$_2$—SiMeCl$_2$, HS—CH$_2$CH$_2$CH$_2$—SiMeBr$_2$, HS—CH$_2$CH$_2$CH$_2$—SiMe$_2$Cl, HS—CH$_2$CH$_2$CH$_2$—SiMe$_2$Br.

Further, the hydrolysable silane compound is preferably a (meth)acryloyl group-containing silane compound (S2) wherein an organic group having a (meth)acryloyl group, and a hydrolysable group or a hydroxyl group, are bonded to a silicon atom, in view of high reactivity with the polymerizable monomer (A) and the stability of the bond. The (meth)acryloyl group-containing silane compound (S2) is preferably a compound represented by the following formula (14):

$$CH_2=C(R^5)-R^2-SiR^3{}_f R^4{}_{3-f} \qquad \text{Formula (14)}$$

wherein $R^5$ is a hydrogen atom or a methyl group, $R^2$ is a bivalent hydrocarbon group, $R^3$ is a hydroxyl group or a hydrolysable group, $R^4$ is a monovalent hydrocarbon group, and f is an integer of from 1 to 3.

In the formula (14), $R^2$ is preferably a $C_{2-6}$ alkylene group, particularly preferably a $C_3$ alkylene group. $R^4$ is preferably an alkyl group having a carbon number of at most 4, particularly preferably a methyl group or an ethyl group. $R^3$ is preferably a hydrolysable group, more preferably a halogen group or an alkoxy group having a carbon number of at most 4, particularly preferably an alkoxy group having a carbon number of at most 4. The halogen is preferably chlorine or bromine. The alkoxy group is more preferably a methoxy group or an ethoxy group in view of favorable hydrolysability. f is preferably 2 or 3.

Typical examples of the (meth)acryloyl group-containing silane compound (S2) represented by the above formula are shown below.

CH$_2$=C(R$^5$)—CH$_2$CH$_2$CH$_2$—Si (OMe)$_3$, CH$_2$=C(R$^5$)—CH$_2$CH$_2$CH$_2$—Si(OEt)$_3$, CH$_2$=C(R$^5$)—CH$_2$CH$_2$CH$_2$—Si(OPr)$_3$, CH$_2$=C(R$^5$)—CH$_2$CH$_2$CH$_2$—SiMe(OMe)$_2$, CH$_2$=C(R$_5$)—CH$_2$CH$_2$CH$_2$—SiMe(OEt)$_2$, CH$_2$=C(R$^5$)—CH$_2$CH$_2$CH$_2$—SiMe(OPr)$_2$, CH$_2$=C(R$^5$)—CH$_2$CH$_2$CH$_2$—SiMe$_2$(OMe), CH$_2$=C(R$^5$)—CH$_2$CH$_2$CH$_2$—SiMe$_2$(OEt), CH$_2$=C(R$^5$)—CH$_2$CH$_2$CH$_2$—SiMe$_2$(OPr), CH$_2$=C(R$^5$)—CH$_2$CH$_2$CH$_2$—SiCl$_3$, CH$_2$=C(R$^5$)—CH$_2$CH$_2$CH$_2$—SiBr$_3$, CH$_2$=C(R$^5$)—CH$_2$CH$_2$CH$_2$—SiMeCl$_2$, CH$_2$=C(R$^5$)—CH$_2$CH$_2$CH$_2$—SiMeBr$_2$, CH$_2$=C(R$^5$)—CH$_2$CH$_2$CH$_2$—SiMe$_2$Cl, CH$_2$=C(R$^5$)—CH$_2$CH$_2$CH$_2$—SiMe$_2$Br.

The blending amount (solid content) of the colloidal silica (D) is preferably from 5 to 300 parts by mass, particularly preferably from 10 to 200 parts by mass, per 100 parts by mass of the polymerizable monomer (A). If the blending amount of the colloidal silica (D) is less than 5 parts by mass per 100 parts by mass of the polymerizable monomer (A), sufficient abrasion resistance of the hard coat layer (W) made of a cured product layer is less likely to be obtained, and if it exceeds 300 parts by mass, haze is likely to occur on the hard coat layer (W) made of a cured product layer, and cracks or the like are likely to occur on the disk due to an external force.

A solvent is preferably blended with the coating composition (X). Preferably, an organic solvent to be used may, for example, be an organic solvent such as a lower alcohol such as ethyl alcohol, butyl alcohol or isopropyl alcohol, a ketone such as methyl isobutyl ketone, methyl ethyl ketone or acetone, an ether such as dioxane, diethylene glycol dimethyl ether, tetrahydrofuran or methyl-t-butyl-ether, or a cellosolve such as methyl cellosolve, ethyl cellosolve, butyl cellosolve or propylene glycol monomethyl ether acetate.

Further, an ester such as n-butyl acetate, isoamyl acetate or diethylene glycol monoacetate, a halogenated hydrocarbon such as a $C_{5-12}$ perfluoroaliphatic hydrocarbon such as perfluorohexane, perfluoromethylcyclohexane or perfluoro-1,3-dimethylcyclohexane, a polyfluoroaromatic hydrocarbon such as 1,3-bis(trifluoromethyl)benzene, or a polyfluoroaliphatic hydrocarbon, or a hydrocarbon such as toluene, xylene or hexane may, for example, be used. Such an organic solvent may be used as a mixture of two or more types thereof in combination.

In a case where an organic solvent is contained in the coating composition (X), it is preferred to select a proper organic solvent in accordance with the type of the thin film cover layer (V) on which the coating composition (X) is coated. For example, when the thin film cover layer (V) is made of an aromatic polycarbonate resin having low solvent resistance, it is preferred to use a solvent providing a low solubility to the aromatic polycarbonate resin, and a lower alcohol, a cellosolve, an ester, an ether or a mixture thereof is appropriate.

The coating composition (X) may contain, as the case requires, at least one functional compounding agent selected from the group consisting of an ultraviolet absorber, a photostabilizer, an antioxidant, a thermal polymerization inhibitor, a leveling agent, a defoaming agent, a thicker, a sedimentation-preventing agent, a pigment (organic coloring pigment, inorganic pigment), a coloring dye, an infrared absorber, a fluorescent brighter, a dispersant, electroconductive fine particles, an antistatic agent, an anti-fogging agent and a coupling agent.

The curable coating composition (X) is coated on the thin film cover layer (V) by a method such as dip coating, spin coating, flow coating, spraying, bar coating, gravure coating, roll coating, blade coating or air knife coating, and dried in the case where the composition contains an organic solvent, and then irradiated with active energy rays and cured.

The active energy rays may, for example, be preferably ultraviolet rays, electron rays, X-rays, radioactive rays or high frequency waves. Ultraviolet rays having a wavelength of from 180 to 500 nm are particularly preferred from economical viewpoint.

As an active energy ray source, an ultraviolet ray irradiation apparatus such as a xenon lamp, a low-pressure mercury lamp, a high-pressure mercury lamp, a superhigh-pressure mercury lamp, a metal halide lamp, a carbon arc lamp or a tungsten lamp, an electron ray irradiation apparatus, an X-ray irradiation apparatus, a high frequency wave generation apparatus or the like may be used.

The active energy ray irradiation period may optionally be changed depending upon conditions such as the type of the polyfunctional compound (A), the type of the active energy ray polymerization initiator (C), the thickness of the coating film and the active energy ray source. Usually the object is achieved by irradiation for 0.1 to 60 seconds. Further, for the purpose of completing the curing reaction, a heat treatment may be carried out after irradiation with active energy rays.

The thickness of the hard coat layer (W) may be variously changed as required. Usually a thickness of from 0.1 to 50 μm is preferred, a thickness of from 0.2 to 20 μm is more preferred, and a thickness of from 0.3 to 10 μm is particularly preferred. When the thickness of the hard coat layer (W) is within this range, the abrasion resistance tends to be sufficient, and the deep portion of the layer will be sufficiently cured.

The hard coat layer (W) has favorable transparency, and its surface is excellent in abrasion resistance and water and oil repellency, and maintains excellent sebum stain proofness over a long period. Thus, the hard coat layer (W) is excellent in stain resistance against grease stains such as fingerprints, sebum, sweat and cosmetics. Such grease stains are less likely to be attached, and even if attached, they are easily be wiped off.

The reason why the hard coat layer (W) of the present invention has excellent sebum stain proofness and fingerprint removability is considered as follows. Fingerprints to be attached to the surface of an optical disk is sweat and sebum components on the fingertip attached to the surface with transcribing the pattern of the fingerprints. It is estimated that the surface of the hard coat layer (W) of the present invention is excellent in water and oil repellency, and thus the surface repels moisture and sebum components contained in the fingerprints, and spherical moisture and sebum components are put on the surface. Accordingly, it is considered that the moisture and sebum components can easily be wiped off, the fingerprints do not adhere to the surface, and thus the layer is excellent in sebum stain proofness and fingerprint removability.

The hard coat layer (W) of the present invention is characterized by having the following characteristics.

A contact angle relative to oleic acid on the surface of the hard coat layer (W) of at least 65 degree initially and at least 60 degree after a moisture resistance test.

A haze of the hard coat layer (W) of at most 3%.

A change in the haze of the hard coat layer (W) of at most 10%, between before and after Taber abrasion test (abrasive wheels: CS-10F, load on one wheel: 500 g, 500 cycles) as defined by ISO9352.

In the present invention, as the index of the water and oil repellency, the contact angle relative to a droplet (specifically, a droplet of each of water and oleic acid) put on the surface of the hard coat layer (W), is employed. The contact angle on the surface of the hard coat layer (W) in the present invention, as measured by procedure shown in Examples as mentioned hereinafter, is as follows.

Water: at least 95 degree (initially), at least 90 degree (after moisture resistance test)

Oleic acid: at least 65 degree, preferably at least 70 degree (initially), at least 60 degree (after moisture resistance test)

Further, the hard coat layer (W) of the present invention is excellent also in transparency. In the present invention, as the index of the transparency of the hard coat layer (W), the haze is employed. The haze of the hard coat layer (W) is at most 3%, preferably at most 1%, more preferably at most 0.5%.

Further, the hard coat layer (W) of the present invention is excellent also in abrasion resistance on its surface. In the present invention, as the index of the abrasion resistance of the surface of the hard coat layer (W), the change in the haze of the hard coat layer (W) between before and after Taber abrasion test (abrasive wheels CS-10F, load on one wheel: 500 g, 500 cycles) as defined by ISO9352 is used. The change in the haze of the hard coat layer (W) is at most 10%, preferably at most 8%, more preferably at most 6%.

Now, the substrate of an optical disk will be described.

As the substrate of an optical disk, preferably, (1) a substrate having a guide groove directly formed on a glass or a transparent resin such as polycarbonate, polymethyl methacrylate or an amorphous polyolefin, or (2) a substrate having a guide groove formed by a photopolymer method may, for example, be mentioned.

On the surface of the guide groove of the above optical disk substrate, a laminated film comprising the following dielectric film, recording film, reflective film, etc., will be formed. The materials of the respective films are not particularly limited.

As the material for the dielectric film, for example, $Si_3N_4$, $SiO_2$, AlSiON, AlSiN, AlN, AlTiN, $Ta_2O_5$ or ZnS may, preferably, be mentioned.

The material for the recording film varies depending upon the recording system. For example, for a recordable optical recording medium, a chalcogenite type alloy of Te, Sn, Se, etc., may, for example, be mentioned; for a phase change type optical recording medium, a chalcogenite type alloy of $TeO_x$, InSe, SnSb, etc., may, for example, be mentioned; and for a magnetooptical disk, an alloy of a transition metal and a rare earth metal, such as TbFeCo or NdDyFeCo (a single layer or an exchange coupling film of two or more layers) may preferably be mentioned.

The material for the reflective film may, for example, preferably be a metal such as Al, Au, Ag or Cu, or an alloy such as Al—Ti or Al—Cr.

The optical disk of the present invention may, for example, be produced as follows.

On the surface of the above optical disk substrate having a guide groove, a recording layer made of a laminated film comprising a dielectric film, a recording film, a reflective film, etc., is formed by a usual method. The dielectric film, the recording film and the reflective film are respectively formed by a physical vapor deposition method such as sputtering or ion plating, or a chemical vapor deposition method such as plasma CVD.

In the present invention, a thin film cover layer (V) is formed on the surface of a recording layer of an optical disk. The thin film cover layer (V) has functions to keep a constant distance between the optical head and the recording layer and to prevent corrosion and deterioration of the recording layer.

As a method for forming the thin film cover layer (V), a method in which a curable resin or the like is uniformly coated by a coating method such as spin coating, a roll coater method or screen printing, followed by curing by irradiation with active energy rays such as ultraviolet rays or electron rays and/or thermal curing, or a method in which a resin film having a predetermined thickness is bonded via an adhesive layer, may, for example, be mentioned.

Such a thin film cover layer (V) is not particularly limited, and a known or well known layer may be employed. For example, as the above-mentioned resin film having a predetermined thickness, a cast polycarbonate film may, for example, be mentioned. Otherwise, such a thin film cover layer (V) may be formed by using a polyfunctional urethane (meth)acrylate compound as disclosed in paragraphs 0024 to 0036 in JP-A-11-240103. As such a polyfunctional urethane (meth)acrylate compound, particularly preferred is a bifunctional compound having a mass average molecular weight of at least 1500 and at most 20,000. By using a bifunctional compound, the curing shrinkage at the time of photopolymerization can be reduced. Further, by employing the mass average molecular weight within the above range, the viscosity of the composition for forming the thin film cover layer (V) can be adjusted within a desired range, and a layer of at least 50 μm can be formed by single coating, and the coating operation will be facilitated.

The thickness of the thin film cover layer (V) is from 5 to 200 μm, preferably from 40 to 160 μm. When the thickness of the thin film cover layer (V) is within the above range, the mechanical strength of the optical disk will be sufficient, and the allowance for a tilt and the allowance for non-uniformity in thickness of the optical disk will be sufficiently large when a short wavelength laser beam with a wavelength of at most 650 nm is used for recording or retrieving data, and the optical characteristics of the optical disk will not be impaired. Further, with respect to the thickness of this layer, the desired value will be accurately determined from the optical design of the recording and retrieving device.

Further, the thin film cover layer (V) may be formed on the recording layer via an adhesive layer, and the adhesive layer is preferably made of an ultraviolet curable resin. The thickness of the adhesive layer is preferably from 0.5 to 50 μm, more preferably from 1 to 30 μm.

The optical disk in the present invention may be a single plate or one having at least two sheets bonded to one another. Further, if necessary, a hub may be attached, or the optical disk may be assembled into a cartridge.

EXAMPLES

Now, the present invention will be explained with reference to Examples of the present invention (Examples 1, 3 and 5 to 8) and Comparative Examples (Examples 2, 4 and 9), however the present invention is not limited thereto.

In each Example, as an optical disk base, two types e.g. an optical disk base a and an optical disk base b were used.

(Optical Disk Base a)

On one side (the surface having a guide groove) of a polycarbonate substrate (diameter: 12 cm, thickness: 1.1 mm) for an optical recording medium, a recording layer made of a laminated film (a reflective film made of Al, a first dielectric film made of SiN, a magnetooptical recording film made of TbFeCo and a second dielectric film made of SiN) was formed by sputtering. A cast polycarbonate film (PURE-ACE, tradename, thickness: 70 μm) manufactured by Teijin Limited as a thin film cover layer (V) was bonded on the surface of the recording layer via an adhesive layer (thickness: 28 μm) to prepare an optical disk base a.

(Optical Disk Base b)

An optical disk base having the same structure as of the optical disk base a except that no reflective film was formed in the recording layer made of a laminated film, was prepared as an optical disk base b.

In each Example, using the optical disk bases a and b, two optical disks a and b were prepared, and various physical properties were measure and evaluated in the following methods.

(Contact Angle)

Using an automatic contact angle meter (DSA10D02: manufactured by KRUSS, Germany), a droplet of 3 μL was formed on the needlepoint in a dry state (20° C., relative humidity 65%), which was brought into contact with the surface of a hard coat layer (W) of the optical disk a to form a droplet. The contact angle is an angle formed by the tangent to the liquid surface at a point where a solid and a liquid are in contact, and the solid surface, and defined as the angle at the side containing the liquid. As the liquid, each of distilled water and oleic acid was used. Further, measurement was carried out with respect to the initial optical disk a and the optical disk a after a moisture resistance test, stored in a humid environment at 60° C. with a relative humidity of 95% for 500 hours.

(Fingerprint Removability)

The fingerprints attached to the surface of a hard coat layer (W) of the optical disk a were wiped off by a non-woven fabric made of cellulose (BEMCOT M-3, manufactured by Asahi Kasei Corporation), and the removability was visually judged. Evaluation was carried out with respective to the above initial optical disk a and the optical disk a after the moisture resistance test.

The evaluation standards were as follows:

◯: Fingerprints completely removable by wiping three times or less.

X: Fingerprints not removable by wiping three times or less.

(Adhesive Properties)

On the surface of a hard coat layer (W) of the optical disk a, eleven cut lines were imparted lengthwise and crosswise with spaces of 1 mm by a razor to form 100 crosscut sections, and a commercially available cellophane tape (manufactured by NICHINBAN CO., LTD.) was intimately adhered and then rapidly pulled for peeling at an angle of 90°, whereby the number of crosscut sections where the coating film remained without being peeled is represented by the number.

(Transparency)

With respect to the optical disk b, in accordance with ISO13468, the haze (%) on four points was measured by a haze meter, and the average was calculated. The haze of the hard coat layer (W) of the optical disk was represented by the value (%) of (haze of the optical disk b)-(haze of the optical disk base b).

(Abrasion Resistance)

With respect to the optical disk b, in accordance with Taber abrasion test as defined by ISO9352, two CS-10F abrasive wheels were respectively combined, with a weight of 500 g and rotated 500 cycles, whereupon the haze was measured by a haze meter. The measurement of the haze was carried out at four points on the cycle orbit of the abrasive wheels, and an average was calculated. The abrasion resistance was represented by the value (%) of (haze of the optical disk b after abrasion test)-(initial haze of the optical disk b).

(Transmittance)

By UV-3100 manufactured by Shimadzu Corporation, the light transmittance at a wavelength of 400 nm was measured. The transmittance of the hard coat layer (W) of the optical disk is represented by the value (%) of (light transmittance of the optical disk b)-(light transmittance of the optical disk base b).

Further, raw materials and the like used in Examples are shown below.

<Raw Material Compounds>

(Polyfunctional Compound (A))

A-1: An acrylic urethane having a molecular weight of 2,300 and an average number of acryloyl groups per molecule of 15, obtained by reacting hydroxyl group-containing dipentaerythritol polyacrylate and hexamethylene diisocyanate.

A-2: Dipentaerythritol hexaacrylate.

(Polymerizable Monomer Other than the Polyfunctional Compound (A))

A-3: Isobornyl acrylate.

(Active Energy Ray Polymerization Initiator (C))

C-1: 2-Methyl-1-(4-methylthiophenyl)-2-morpholinopropan-1-one.

(Colloidal Silica (D))

D-1: Colloidal silica having a hydrolyzed condensate of a mercapto group-containing silane compound on its surface, obtained in such a manner that 2.5 parts by mass of 3-mercaptopropyltrimethoxysilane was added to 100 parts by mass of ethyl cellosolve dispersion type colloidal silica (silica content 30 mass %, average particle size 11 nm) and stirred at 80° C. in a stream of nitrogen for 5 hours under heating, followed by aging at room temperature for 12 hours.

D-2: Colloidal silica having a hydrolyzed condensate of a methacryloyl group-containing silane compound on its surface, obtained in such a manner that 2.5 parts by mass of 3-methacryloyloxypropyltrimethoxysilane was added to 100 parts by mass of propylene glycol monomethyl ether acetate dispersion type colloidal silica (silica content 30 mass %, average particle size 11 nm) and stirred at 50° C. for 3 hours, followed by aging at room temperature for 12 hours.

(Water and Oil Repellency-Imparting Agent (B)

The following number average molecular weight is a value measured by means of gel permeation chromatography employing polystyrene as a standard substance.

B-1: Into a 300 mL four-necked flask equipped with a stirrer and a condenser, 80 mg of titanium tetraisobutoxide, 100 g of polyfluoropolyethylene oxide having hydroxyl groups on both terminals (FOMBLIN Z-dol 1000, manufactured by Solvay Solexis K.K., $HOCH_2(CF_2CF_2O)_p$ $(CF_2O)_sCF_2CF_2CH_2OH$, average molecular weight 1,000) and 25 g of ε-caprolactone were added, followed by heating at 150° C. for 5 hours, to obtain a white waxy compound having ε-caprolactone added by ring-opening to both terminals of polyfluoropolyethylene oxide. The number average molecular weight was 1,250, and the degree of polymerization of caprolactone at each terminal was about 1.1

Then, the obtained compound was cooled to room temperature, 67 g of 1,3-bis(trifluoromethyl)benzene and 60 mg of 2,6-di-t-butyl-p-cresol were added thereto, followed by stirring for 30 minutes, and then 31.0 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure to obtain a water and oil repellency-imparting agent (B-1) having its terminal modified with a methacryloyl group. The number average molecular weight of (B-1) was 1,560.

Preparation of Compound M ($CF_3O(CF_2CF_2O)_p$ $CF_2CH_2OH$, p≈7.3) as a Raw Material of B-2 TO B-7

In the following description, tetramethylsilane will be referred to as TMS, $CClF_2CF_2CHClF$ will be referred to as AK-225, and $CCl_2FCClF_2$ will be referred to as R113.

Step 1) Commercially available polyoxyethylene glycol monomethyl ether ($CH_3O(CH_2CH_2O)_{p+1}H$, p≈7.3) (25 g), AK-225 (20 g), NaF (1.2 g) and pyridine (1.6 g) were put in a flask and vigorously stirred while keeping the internal temperature to at most 10° C., and nitrogen was bubbled. $FCOCF(CF_3)OCF_2CF(CF_3)OCF_2CF_2CF_3$ (46.6 g) was dropwise added thereto over a period of 3.0 hours while keeping the internal temperature to at most 5° C. After completion of the dropwise addition, stirring was carried out at 50° C. for 12 hours and then at room temperature for 24 hours, and the resulting crude liquid was recovered. The crude liquid was subjected to filtration under reduced pressure, and then the recovered liquid was dried in a vacuum dryer (50° C., 667 Pa) for 12 hours. The crude liquid thus obtained was dissolved in 100 ml of AK-225, washed with 1,000 ml of a saturated sodium bicarbonate aqueous solution three times, and the organic phase was recovered. Further, magnesium sulfate (1.0 g) was added to the recovered organic phase, followed by stirring for 12 hours. Then, pressure filtration was carried out to remove magnesium sulfate, and AK-225 was distilled off by an evaporator to obtain 56.1 g of a polymer which was liquid at room temperature. As a result of $^1$H-NMR and $^{19}$F-NMR analyses, the obtained polymer was confirmed to 5 be a compound represented by $CH_3O(CH_2CH_2O)_{p+1}COCF(CF_3)OCF_2CF$ $(CF_3)OCF_2CF_2CF_3$ (p is as defined above).

Step 2) R-113 (1,560 g) was added in a 500 mL autoclave made of hastelloy, stirred and kept at 25° C. At the autoclave gas outlet, a condenser kept at 20° C., a NaF pellet packed bed and a condenser kept at 20° C. were disposed in series. Here, a liquid return line to recover the condensed liquid to the autoclave was disposed to the condenser kept at −20° C. A nitrogen gas was blown for 1.0 hour, and then a fluorine gas diluted to 10% with a nitrogen gas (hereinafter referred to as 10% fluorine gas) was blown at a flow rate of 24.8 L/h for 1 hour.

Then, while blowing the 10% fluorine gas at the same 20 flow rate, a solution having the product (27.5 g) obtained in Step 1 dissolved in R-113 (1,350 g) was injected over a period of 30 hours.

Then, while blowing the 10% fluorine gas at the same flow rate, 12 mL of an R-113 solution was injected. At 25 that time, the internal temperature was changed to 40° C. Then, an R-113 solution (6 mL) having benzene dissolved at a concentration of 1 wt % was injected. Further, a fluorine gas was blown for 1.0 hour, and then a nitrogen gas was blown for 1.0 hour.

After completion of the reaction, the solvent was distilled off by vacuum drying (60° C., 6.0 hours) to obtain 45.4 g of a product which was liquid at room temperature. As a result of NMR analysis, the product was confirmed to be a compound represented by $CF_3O(CF_2CF_2O)_{p+1}COCF(CF_3)OCF_2CF(CF_3)OCF_2CF_2CF_3$ having 99.9% of the total number of hydrogen atoms in the product obtained in Step 1 substituted by fluorine atoms.

Step 3) The interior of a 300 mL round flask into which a stirrer chip was put, was sufficiently flushed with nitrogen. Methanol (36 g), NaF (5.6 g) and AK-225 (50 g) were added thereto, and the product (43.5 g) obtained in Step 2 was dropwise added thereto, followed by vigorous stirring while bubbling at room temperature. Nitrogen sealing was applied to the round flask outlet.

8 Hours later, excess methanol and reaction by-products were distilled off while keeping the interior of the system under reduced pressure by disposing a vacuum pump to the condenser. 24 Hours later, 26.8 g of a product which was liquid at room temperature was obtained.

As a result of analysis, it was confirmed that a compound represented by $CF_3O(CF_2CF_2O)_pCF_2COOCH_3$ having all the ester groups in the product obtained in Step 2 converted into methyl ester was the main product.

Step 4) The interior of a 300 mL round flask into which a stirrer chip was put, was sufficiently flushed with nitrogen. 2-Propanol (30 g), AK-225 (50.0 g) and $NaBH_4$ (4.1 g) were added, and the product (26.2 g) obtained in Step 3 was diluted with AK-225 (30 g) and dropwise added thereto. Then, vigorous stirring was carried out at room temperature, and nitrogen sealing was applied to the round flask outlet.

8 Hours later, the solvent was distilled off while keeping the interior of the system under reduced pressure by disposing a vacuum pump to the condenser. 24 Hours later, AK-225 (100 g) was put, and a 0.2N hydrochloric acid aqueous solution (500 g) was dropwise added thereto with stirring. After dropwise addition, stirring was continued for 6 hours. Then, the resulting organic phase was washed with distilled water (500 g) three times, and the organic phase was recovered by two-layer separation. Further, magnesium sulfate (1.0 g) was added to the recovered organic phase, followed by stirring for 12 hours. Then, pressure filtration was carried out to remove magnesium sulfate, and AK-225 was distilled off by an evaporator to obtain 24.8 g of a polymer which was liquid at room temperature.

As a result of analysis, it was confirmed that a compound represented by $CF_3O(CF_2CF_2O)_pCF_2CH_2OH$ having all the ester groups of the product obtained in Step 3 reduced was the main product.

B-2: Into a 300 mL four-necked flask equipped with a stirrer and a condenser, 80 mg of titanium tetraisobutoxide, 100 g of the compound M and 25 g of ε-caprolactone were added, followed by heating at 150° C. for 5 hours, to obtain a white waxy water and oil repellency-imparting agent (B-2) having ε-caprolactone added by ring-opening to the terminal of polyfluoropolyethylene oxide. The molecular weight of (B-2) was 1,250, and the degree of polymerization of caprolactone was about 2.2.

B-3: Into a 300 mL four-necked flask equipped with a stirrer and a condenser, 125 g of the water and oil repellency-imparting agent (B-2), 60 g of 1,3-bis(trifluoromethyl)benzene and 60 mg of 2,6-di-t-butyl-p-cresol were added, followed by stirring for 30 minutes, and then 15.5 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure, to obtain a water and oil repellency-imparting agent (B-3) having its terminal modified with a methacryloyl group. The molecular weight of (B-3) was 1,400.

B-4: Into a 300 mL four-necked flask equipped with a stirrer, 100 g of the compound M and 60 mg of 2,6-di-t-butyl-p-cresol were added, followed by stirring for 30 minutes, and then 31.0 g of 2-methacryloyloxyethyl isocyanate was added thereto, followed by stirring at room temperature further for 24 hours to obtain a water and oil repellency-imparting agent (B-4) having its terminal modified with a methacryloyl group. The number average molecular weight of (B-4) was 1,160.

B-5: Into a 300 mL four-necked flask equipped with a stirrer and a condenser, 600 mg of 2,2'-azobis(2-methylpropionitrile), 740 mg of n-dodecylmercaptan, 90 g of butyl acetate and 90 g of 1,3-bis(trifluoromethyl)benzene were added, followed by stirring at room temperature for 15 minutes, and then 45 g of the above water and oil repellency-imparting agent (B-3) and 15 g of a macromer having one terminal of the polypropylene oxide denatured by an acryloyl group (BLENMER AP-800 manufactured by NOF CORPORATION, $CH_2=CHCOO-(CH_2CH(CH_3)O)_y-H$, y≈13, hydroxyl value: 66.8) were added thereto, followed by nitrogen purge, and then stirring was carried out at 70° C. for 18 hours to carry out polymerization, to obtain a reaction product.

As a result, a copolymer having a number average molecular weight of 10,000 was obtained. Then, the obtained reaction product was cooled to room temperature, 50 mg of dibutyltin dilaurate and 100 mg of 2,6-di-t-butyl-p-cresol were added thereto, followed by stirring at room temperature for 30 minutes, and then 2.27 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure, to obtain a water and oil repellency-imparting agent (B-5) having the polypropylene oxide terminal of the polymer units of the copolymer modified with a methacryloyl group. The number average molecular weight of (B-5) was 10,460.

B-6: Into a 300 mL four-necked flask equipped with a stirrer and a condenser, 600 mg of 2,2'-azobis(2-methylpropionitrile), 740 mg of n-dodecylmercaptan and 180 g of butyl acetate were added, followed by stirring at room temperature for 15 minutes, and then 45 g of the above water and oil repellency-imparting agent (B-10) and 15 g of unsaturated fatty acid hydroxyalkyl ester-modified ε-caprolactone (PLACCEL FA2D, manufactured by DAICEL CHEMICAL INDUSTRIES, LTD., degree of polymerization of caprolactone:2) were added thereto, followed by nitrogen purge, and then stirring was carried out at 70° C. for 18 hours to carry out polymerization, to obtain a reaction product.

As a result, a copolymer having a number average molecular weight of 35,000 was obtained. Then, the obtained reaction product was cooled to room temperature, 50 mg of dibutyltin dilaurate and 100 mg of 2,6-di-t-butyl-p-cresol were added thereto, followed by stirring at room temperature for 30 minutes, and then 6.69 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure, to obtain a water and oil repellency-imparting agent (B-6) having the unsaturated fatty acid hydroxyalkyl ester modified ε-caprolactone terminal of the polymer units of the copolymer modified with a methacryloyl group. The number average molecular weight of (B-6) was 39,000.

B-7: Into a 300 mL four-necked flask equipped with a stirrer and a condenser, 580 mg of potassium fluoride, 100 g of the compound M and 9.12 g of ethylene carbonate were added, followed by heating for 40 hours with decarboxylation at 160° C., to obtain a colorless and transparent oily compound having one unit of ethylene oxide added to the terminal of the compound M.

Potassium fluoride in the system was separated by filtration, and then into the 300 mL four-necked flask equipped with a stirrer and a condenser, 80 mg of titanium tetraisobutoxide, 109 g of the above oily compound and 25 g of ε-caprolactone were added, followed by heating at 150° C. for 5 hours, to obtain a white waxy compound having ε-caprolactone added by ring-opening to the terminal of the compound M by means of one unit of ethylene oxide. The number average molecular weight was 1,400, and the degree of polymerization of caprolactone was about 2.2.

Then, 60 g of 1,3-bis(trifluoromethyl)benzene and 60 mg of 2,6-di-t-butyl-p-cresol were added thereto, followed by stirring for 30 minutes, and then 15.5 g of 2-methacryloyloxyethyl isocyanate was added thereto, followed by stirring at room temperature further for 24 hours, and the reaction was completed. Then, 1,3-bis(trifluoromethyl)benzene as the solvent was distilled off at 40° C. under reduced pressure to obtain a water and oil repellency-imparting agent (B-7) having its terminal modified with a methacryloyl group. The number average molecular weight of (B-7) was 1,550.

B-8: Dimethylsilicone oil having part of its side chains substituted by a $C_8F_{17}CH_2CH_2$ group (tradename "FLS525", manufactured by Asahi Glass Company, Limited). A water and oil repellency-imparting agent having no moiety (b-2) nor functional group (b-3).

<Preparation of Optical Disk>

Example 1

To a 300 mL four-necked flask equipped with a stirrer and a condenser, 80 g of the polymerizable monomer (A-2), 0.3 g of the water and oil repellency-imparting agent (B-1), 4.0 g of the active energy ray polymerization initiator (C-1), 1.0 g of hydroquinone monomethyl ether as a thermal polymerization inhibitor and 65.0 g of butyl acetate (AcBt) as an organic solvent were put and stirred for 1 hour at room temperature in an light shielding state for homogenization. Then, with stirring, 75.0 g of the colloidal silica (D-1) was slowly added and further stirred for 1 hour at room temperature in a light shielding state for homogenization.

Then, 65.0 g of dibutyl ether (DBE) as an organic solvent was added, followed by stirring at room temperature in a light shielding state for 1 hour to obtain a coating composition (X1). Then, the coating composition (X1) was spin coated (2,000 rpm×10 seconds) on the surface of each of the optical disk bases a and b and preliminarily dried in a circulating hot air oven at 90° C. for 1 minute, and then the hard coat layer was cured by using a high-pressure mercury lamp (amount of light: 1,200 mJ/cm$^2$, an integrated energy amount of ultraviolet rays in a wavelength region of from 300 to 390 nm). In such a manner, optical disks a1 and b1 having adhesive layer/thin film cover layer/hard coat layer (film thickness of hard coat layer: 18 μm) formed on the surface of the recording layer of the optical disk substrate were obtained. Using the optical disks a1 and b1, measurement and evaluations were carried out with respect to the above items. The results are shown in Table 3.

Examples 2 to 9

Optical disks a2 to a9 and optical disks b2 to b9 were produced in the same manner as in Example 1 except that the types and amounts of the polyfunctional compound (A), the water and oil repellency-imparting agent (B), the active

TABLE 1

| Water and oil repellency-imparting agent | Type | Structure |
|---|---|---|
| B-1 | Straight chain type | $CH_2=C(CH_3)COOC_2H_4NHCOO-(C(=O)C_5H_{10}O)_t-CH_2(CF_2CF_2O)_p(CF_2O)_sCF_2CF_2CH_2O-(C(=O)C_5H_{10}O)_t-CONHC_2H_4OCOC(CH_3)=CH_2$<br>t≈1.1 |
| B-2 | No functional group (b-3) | $CF_3O(CF_2CF_2O)_pCF_2CH_2O-(C(=O)C_5H_{10}O)_t-H$<br>p≈7.3, t≈2.2 |
| B-3 | Straight chain type | $CF_3O(CF_2CF_2O)_pCF_2CH_2O-(C(=O)C_5H_{10}O)_t-CONHC_2H_4OCOC(CH_3)=CH_2$<br>p≈7.3, t≈2.2 |
| B-4 | No moiety (b-2) | $CF_3O(CF_2CF_2O)_pCF_2CH_2O-CONHC_2H_4OCOC(CH_3)=CH_2$<br>p≈7.3 |
| B-5 | Copolymerization type | $-[CH_2-C(CH_3)CO\{P\}]_f-[CH_2-CHCO\{Q\}]_g-$<br>f≈6.5, g≈3.0<br>{P}: $CF_3O(CF_2CF_2O)_pCF_2CH_2O-CONHC_2H_4O-$<br>{Q}: $CH_2=C(CH_3)COOC_2H_4NHCOO-(CH_2CH(CH_3)O)_y-$<br>p≈7.3, y≈13 |
| B-6 | Copolymerization type | $-[CH_2-C(CH_3)CO\{P\}]_f-[CH_2-CHCO\{Q\}]_g-$<br>f≈22.6, g≈26.7<br>{P}: $CF_3O(CF_2CF_2O)_pCF_2CH_2O-CONHC_2H_4O-$<br>{Q}: $CH_2=C(CH_3)COOC_2H_4NHCOO-(COC_5H_{10}-O)_x-C_2H_4O-$<br>p≈7.3, X≈2 |
| B-7 | Straight chain type | $CF_3O(CF_2CF_2O)_pCF_2CH_2O-CH_2CH_2O-(C(=O)C_5H_{10}O)_t-CONHC_2H_4OCOC(CH_3)=CH_2$<br>p≈7.3, t≈2.2 | energy ray polymerization initiator (C), the colloidal silica (D) and the organic solvent in the coating composition in Example 1 were changed to the types and amounts (unit: g) as identified in Table 2, and the same measurements and evaluations as in Examples 1 were carried out. The results are shown in Table 3.

TABLE 2

|  | A | B | C | D | AcBt | DBE |
|---|---|---|---|---|---|---|
| Ex. 1 | A-2: 80 g | B-1: 0.3 g | C-1: 4.0 g | D-1: 75.0 g | 65.0 g | 65.0 g |
| Ex. 2 | A-2: 80 g | B-2: 0.3 g | C-1: 4.0 g | D-1: 75.0 g | 65.0 g | 65.0 g |
| Ex. 3 | A-2: 80 g | B-3: 0.3 g | C-1: 4.0 g | D-1: 75.0 g | 65.0 g | 65.0 g |
| Ex. 4 | A-1: 60 g A-3: 20 g | B-4: 0.8 g | C-1: 4.0 g | D-1: 75.0 g | 65.0 g | 65.0 g |
| Ex. 5 | A-1: 60 g A-3: 20 g | B-5: 0.8 g | C-1: 4.0 g | D-1: 75.0 g | 65.0 g | 65.0 g |
| Ex. 6 | A-1: 60 g A-3: 20 g | B-6: 0.8 g | C-1: 4.0 g | D-1: 75.0 g | 65.0 g | 65.0 g |
| Ex. 7 | A-2: 80 g | B-7: 0.3 g | C-1: 4.0 g | D-1: 75.0 g | 65.0 g | 65.0 g |
| Ex. 8 | A-2: 80 g | B-7: 0.3 g | C-1: 4.0 g | D-2: 75.0 g | 65.0 g | 65.0 g |
| Ex. 9 | A-1: 60 g A-3: 20 g | B-8: 0.8 g | C-1: 4.0 g | D-1: 75.0 g | 65.0 g | 65.0 g |

TABLE 3

| | Contact angle Distilled water/oleic acid | | Fingerprint removability | | | | | |
|---|---|---|---|---|---|---|---|---|
| | Initial | After moisture resistance test | Initial | After moisture resistance test | Adhesive properties (number) | Transparency (%) | Abrasion resistance (%) | Transmittance (%) |
| Ex. 1 | 112/77 | 106/72 | ○ | ○ | 100 | 0.3 | 2.8 | 89 |
| Ex. 2 | 109/71 | 70/45 | ○ | ○ | 100 | 0.3 | 2.9 | 88 |
| Ex. 3 | 113/78 | 111/77 | ○ | ○ | 100 | 0.3 | 3.0 | 89 |
| Ex. 4 | 100/70 | 98/68 | ○ | ○ | 100 | 8.5 | 3.5 | 62 |
| Ex. 5 | 108/72 | 106/71 | ○ | ○ | 100 | 0.3 | 5.2 | 89 |
| Ex. 6 | 109/74 | 107/72 | ○ | ○ | 100 | 0.3 | 6.0 | 90 |
| Ex. 7 | 108/71 | 107/70 | ○ | ○ | 100 | 0.2 | 2.9 | 90 |
| Ex. 8 | 108/72 | 107/71 | ○ | ○ | 100 | 0.2 | 2.8 | 80 |
| Ex. 9 | 103/55 | 60/30 | X | X | 100 | 0.6 | 1.3 | 81 |

According to the present invention, an optical disk of a type wherein a recording layer and a thin film cover layer are laminated in this order on the surface of a substrate, and the recording layer is to be irradiated through the thin film cover layer with a laser beam having a short wavelength represented by a blue laser to be used for recording and/or retrieving data, wherein a hard coat layer excellent in abrasion resistance, transparency and long-term sebum stain proofness, particularly removability of fingerprints attached to its surface, is formed on the surface of the thin film cover layer, can be provided.

The entire disclosures of Japanese Patent Application No. 2002-333366 filed on Nov. 18, 2002 and Japanese Patent Application No. 2003-088301 filed on Mar. 27, 2003 including specifications, claims, drawings and summaries are incorporated herein by reference in their entireties.

What is claimed is:

1. An optical disk of a system wherein a substrate, a recording layer and a thin film cover layer (V) with a thickness of from 5 to 200 μm, are laminated in this order, and the recording layer is to be irradiated through the thin film cover layer (V) with a blue laser beam to be used for recording and/or retrieving data, wherein a hard coating layer (W) is formed on the thin film cover layer (V), and the hard coat layer (W) is made of a cured product of a coating composition (X) comprising a polyfunctional compound (A) having at least two active energy ray curable polymerizable functional groups, a water and oil repellency-imparting agent (B), an active energy ray polymerization initiator (C) and a colloidal silica (D) having an average particle size of from 1 to 200 nm, provided that the water and oil repellency-imparting agent (B) is a water and oil repellency-imparting agent (B-T) having, in one molecule, a moiety (b-1) exerting water and oil repellency and selected from the group consisting of portions represented by the following formulae (6) to (8), a moiety (b-2) made of at least one portion selected from the group consisting of portions represented by the following formulae (1) to (4), and an active energy ray curable functional group (b-3):

  Formula (1)

  Formula (2)

  Formula (3)

  Formula (4)

wherein $R^1$ is a $C_{6-20}$ alkylene group, each of x and y is an integer of from 5 to 100, u is an integer of from 3 to 5, and t is an integer of from 1 to 20,

  Formula (6)

  Formula (7)

  Formula (8)

wherein each of p, q, and r is an integer of from 1 to 100.

2. The optical disk according to claim 1, wherein in the water and oil repellency-imparting agent (B-T), the moiety (b-1) exerting water and oil repellency is made of at least one portion selected from the group consisting of portions represented by the following formulae (10) to (12):

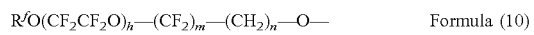  Formula (10)

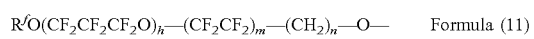  Formula (11)

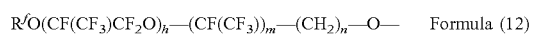  Formula (12)

wherein $R^f$ is a $C_{1-16}$ polyfluoroalkyl group (including one having an oxygen atom), h is an integer of from 1 to 50, each of m and n is an integer of from 0 to 3, and $6 \geqq m+n>0$.

3. The optical disk according to claim 1, wherein the coating composition (X) comprises 100 parts by mass of the polyfunctional compound (A) having at least two active energy ray curable polymerizable functional groups, from 0.01 to 10 parts by mass of the water and oil repellency-imparting agent (B), from 0.01 to 20 parts by mass of the active energy ray polymerization initiator (C) and from 5 to 300 parts by mass of the colloidal silica (D).

4. The optical disk according to claim 1, wherein the colloidal silica (D) is a modified colloidal silica obtained by surface modification with a mercapto group-containing silane compound (S1) wherein an organic group having a mercapto group, and a hydrolysable group or a hydroxyl group, are bonded to a silicon atom.

5. The optical disk according to claim 4, wherein the mercapto group-containing silane compound (S1) is a compound represented by the following formula (13):

$$HS—R^2—SiR^3{}_kR^4{}_{3-k} \qquad \text{Formula (13)}$$

wherein $R^2$ is a bivalent hydrocarbon group, $R^3$ is a hydroxyl group or a hydrolysable group, $R^4$ is a monovalent hydrocarbon group, and k is an integer of from 1 to 3.

6. The optical disk according to claim 1, wherein the colloidal silica (D) is a modified colloidal silica obtained by surface modification with a (meth)acryloyl group-containing silane compound (S2) wherein an organic group having a (meth)acryloyl group, and a hydrolysable group or a hydroxyl group, are bonded to a silicon atom.

7. The optical disk according to claim 6, wherein the (meth)acryloyl group-containing silane compound (S2) is a compound represented by the following formula (14):

$$CH_2=C(R^5)—R^2—SiR^3{}_fR^4{}_{3-f} \qquad \text{Formula (14)}$$

wherein $R^5$ is a hydrogen atom or a methyl group, $R^2$ is a bivalent hydrocarbon group, $R^3$ is a hydroxyl group or a hydrolysable group, $R^4$ is a monovalent hydrocarbon group, and f is an integer of from 1 to 3.

8. An optical disk of a system wherein a substrate, a recording layer and a thin film cover layer (V) with a thickness of from 5 to 200 μm, are laminated in this order, and the recording layer is to be irradiated through the thin film cover layer (V) with a laser beam to be used for recording and/or retrieving data, wherein a hard coating layer (W) is formed on the thin film cover layer (V), and the hard coat layer (W) has a contact angle on its surface relative to oleic acid of at least 65 degree initially and at least 60 degree after a moisture resistance test, a haze of at most 3%, and a change in the haze by Taber abrasion test (abrasive wheels: CS-10F, load on one wheel: 500 g, 500 cycles) as defined by ISO9352 of at most 10%.

9. The optical disk according to claim 8, wherein the hard coat layer (W) is made of a cured product layer formed by curing a coating composition (X) comprising a polyfunctional compound (A) having at least two active energy ray curable polymerizable functional groups, a water and oil repellency-imparting agent (B), an active energy ray polymerization initiator (C) and a colloidal silica (D) having an average particle size of from 1 to 200 nm.

10. The optical disk according to claim 1, wherein the hard coat layer (W) has a contact angle on its surface relative to oleic acid of at least 65 degree initially and at least 60 degree after a moisture resistance test, a haze of at most 3%, and a change in the haze by Taber abrasion test (abrasive wheels: CS-10F, load on one wheel: 500 g, 500 cycles) as defined by ISO9352 of at most 10%.

11. The optical disk according to claim 8, wherein in the water and oil repellency-imparting agent (B-T), the moiety (b-1) exerting water and oil repellency is made of at least one portion selected from the group consisting of portions represented by the following formulae (5) to (9):

$$C_kF_{2k+1}— \qquad \text{Formula (5)}$$

$$—(CF_2CF_2O)_p— \qquad \text{Formula (6)}$$

$$—(CF_2CF(CF_3)O)_q— \qquad \text{Formula (7)}$$

$$—(CF_2CF_2CF_2O)_r— \qquad \text{Formula (8)}$$

$$—(CF_2O)_s— \qquad \text{Formula (9)}$$

wherein k is an integer of from 1 to 16, and each of p, q, r and s is an integer of from 1 to 100.

12. The optical disk according to claim 11, wherein in the water and oil repellency-imparting agent (B-T), the moiety (b-1) exerting water and oil repellency is made of at least one portion selected from the group consisting of portions represented by the following formulae (10) to (12):

$$R^fO(CF_2CF_2O)_h—(CF_2)_m—(CH_2)_n—O— \qquad \text{Formula (10)}$$

$$R^fO(CF_2CF_2CF_2O)_h—(CF_2CF_2)_m—(CH_2)_n—O— \qquad \text{Formula (11)}$$

$$R^fO(CF(CF_3)CF_2O)_h—(CF(CF_3))_m—(CH_2)_n—O— \qquad \text{Formula (12)}$$

wherein $R^f$ is a $C_{1-16}$ polyfluoroalkyl group (including one having an oxygen atom), h is an integer of from 1 to 50, each of m and n is an integer of from 0 to 3, and $6 \geqq m+n>0$.

13. The optical disk according to claim 8, wherein the coating composition (X) comprises 100 parts by mass of the polyfunctional compound (A) having at least two active energy ray curable polymerizable functional groups, from 0.01 to 10 parts by mass of the water and oil repellency-imparting agent (B), from 0.01 to 20 parts by mass of the active energy ray polymerization initiator (C) and from 5 to 300 parts by mass of the colloidal silica (D).

14. The optical disk according to claim 8, wherein the colloidal silica (D) is a modified colloidal silica obtained by surface modification with a mercapto group-containing silane compound (S1) wherein an organic group having a mercapto group, and a hydrolysable group or a hydroxyl group, are bonded to a silicon atom.

15. The optical disk according to claim 14, wherein the mercapto group-containing silane compound (S1) is a compound represented by the following formula (13):

$$HS—R^2—SiR^3{}_kR^4{}_{3-k} \qquad \text{Formula (13)}$$

wherein $R^2$ is a bivalent hydrocarbon group, $R^3$ is a hydroxyl group or a hydrolysable group, $R^4$ is a monovalent hydrocarbon group, and k is an integer of from 1 to 3.

16. The optical disk according to claim 8, wherein the colloidal silica (D) is a modified colloidal silica obtained by surface modification with a (meth)acryloyl group-containing silane compound (S2) wherein an organic group having a (meth)acryloyl group, and a hydrolysable group or a hydroxyl group, are bonded to a silicon atom.

17. The optical disk according to claim 16, wherein the (meth)acryloyl group-containing silane compound (S2) is a compound represented by the following formula (14):

 Formula (14)

wherein $R^5$ is a hydrogen atom or a methyl group, $R^2$ is a bivalent hydrocarbon group, $R^3$ is a hydroxyl group or a hydrolysable group, $R^4$ is a monovalent hydrocarbon group, and f is an integer of from 1 to 3.

18. The optical disk according to claim 1, wherein an initial contact angle relative to oleic acid on the surface of the hard coat layer (W) is at least 65 degrees.

* * * * *